March 26, 1929.　　　E. E. GREVE　　　1,706,921

BRAKE MECHANISM FOR HOISTING DRUMS

Filed March 8, 1924

INVENTOR
Edgar E. Greve
by W. D. Doolittle
his attorney.

Patented Mar. 26, 1929.

1,706,921

UNITED STATES PATENT OFFICE.

EDGAR E. GREVE, OF BELLEVUE, PENNSYLVANIA.

BRAKE MECHANISM FOR HOISTING DRUMS.

Application filed March 8, 1924. Serial No. 697,748.

This invention is for a brake for hoisting drums, particularly drums of the character used in oil and gas drilling rigs, and relates particularly to the provision of an equalizing mechanism for distributing the braking pressure equally to both braking surfaces.

I am aware that in automatic vehicles and certain other instances, where there is more than one brake operated from a common operating means, equalizers have been employed.

In oil well drilling rigs, it is a common practice to provide a braking surface at each end of the hoisting drum, and to have a brake cooperating with each surface. Sometimes these brakes are separate, so that two men are necessary to set the brakes, one man for each brake. At other times, they are connected so as to operate from a single operating mechanism, but in such cases, they are never kept in uniform adjustment, so that a great deal more wear comes on one band than the other.

The present invention has for its principal object to provide, in combination with the drum and brake bands, an equalizer so that both brakes may be evenly set from a single operating handle.

The invention has for its further objects to provide an improved brake construction of a simple but strong and durable nature.

When it is realized that the drum of the hoist carries the entire load through the casing line, and that this line may carry a string of pipe as much as five thousand or more feet at twenty-eight pounds to the foot, it will be appreciated that a positive and safe brake is essential. When the braking mechanism of the hoist fails, there is invariably a great loss to the operator.

Figure 1:
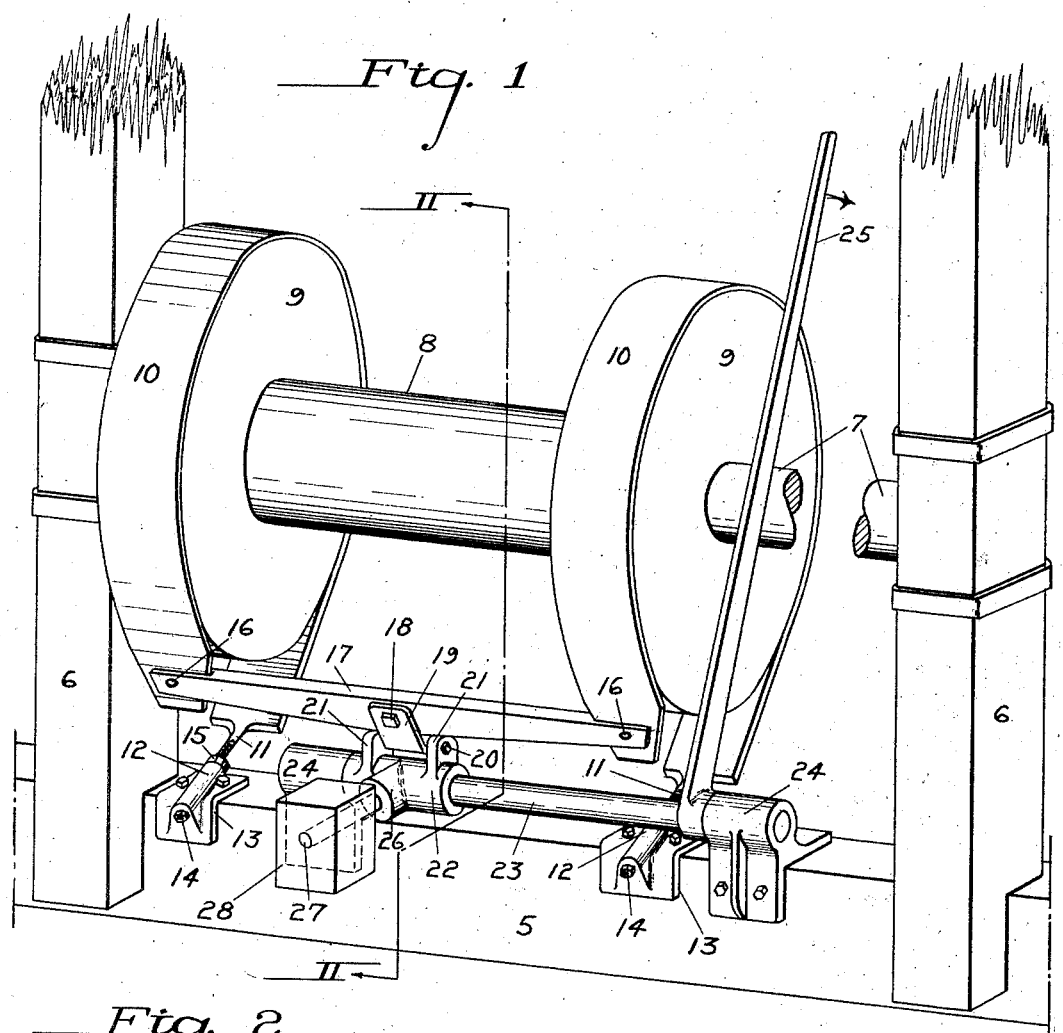
Figure 2:
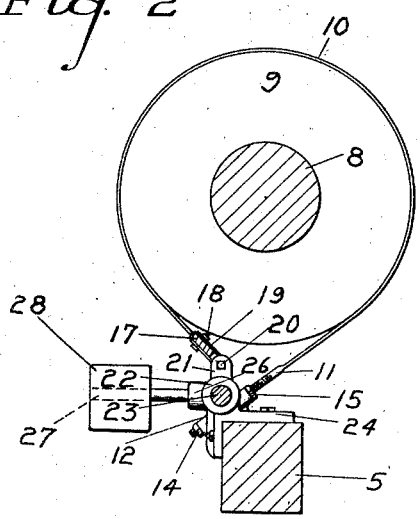

My improved braking mechanism may be readily understood by reference to the accompanying drawings, in which:

Fig. 1 is a perspective view of a hoist having my invention applied thereto; and Fig. 2 is a section in the plane of line II—II of Fig. 1.

In the drawings, 5 designates the sill of the derrick, 6 are the posts for the hoist, 7 is a shaft journalled on the posts in the usual manner, carrying the drum 8 with brake flanges 9. Surrounding each flange 9 is a brake band 10 having one end adjustably anchored to the sill through a thread extension 11 on the brake band, which passes through a guide 12 on an angle-cleat 13 secured to the sill. Nuts 14 and 15, respectively, allow for taking up or letting out the brake band.

The free end of one band is pivotally connected at 16 to one end of an equalizer bar 17, and the free end of the other band is pivotally connected at 16 with the other end of the same bar.

The bar 17 is pivotally supported midway between its ends on a bolt or fulcrum 18 carried in a member 19, the latter being pivotally supported by a bolt 20 in lugs 21 on a sleeve 22 fixed to shaft 23. Shaft 23 is supported in bearings 24 secured to the sill, these bearings having angular base portions to engage the corner of the sill. Fixed on shaft 23, at one end of the drum, is an operating lever 25. Sleeve 22 has a radial extension 26 thereon from which projects a rod 27 carrying a counterweight 28.

The drawings, for the purpose of best illustrating the brake, do not show the various sprokets and clutches generally provided on the drum shaft for driving the hoist. It will be noted that the entire brake mechanism is carried on the sill, and not on the hoist or the super-structure. This simplifies construction and also permits shaft 23 to be of a minimum length.

The operation of the brake is simple. When lever 25 is pushed in the direction of the arrow of Fig. 1, member 19 pulls down on bar 17; tightening both brake bands and applying equal pressure to each. When the lever is released, counter-weight 28 rotates shaft 23 in the opposite direction, causing toggle 19 to lift up to loosen the bands. The bands may be adjusted from time to time, as necessary.

I claim as my invention:

1. In a hoist for well-drilling rigs, the combination with a sill, of a drum supported above the sill having spaced braking flanges, a brake band about each flange, means on said sill anchoring one end of each band thereto, an equalizer bar attached to the bands adjacent the other ends thereof, an operating shaft below said bar, bearing means on said sill journalling said shaft, and an operative connection between said shaft and said bar.

2. In a hoist for well-drilling rigs, the combination with a sill, of a drum supported above the sill having spaced braking flanges, a brake band about each flange, means on said sill anchoring one end of each band thereto, an equalizer bar attached to the bands adjacent the other ends thereof, an operating shaft below said bar, bearing means on said sill journalling said shaft, and an operative connection between said shaft and said bar permitting movement of the bar on an axis parallel to the shaft axis and on an axis transverse to said shaft axis.

3. In a hoist for well-drilling rigs, the combination with spaced posts and a transverse supporting member located therebetween, of a drum located above the supporting member having spaced braking flanges, a brake band about each flange, angle cleat means on said supporting member anchoring one end of each band thereto, an equalizer bar attached to the bands adjacent the other ends thereof, an operating shaft below said bar of less length than the distance between said posts, angle bearing means on said supporting member journalling said shaft, and an operative connection between said shaft and said bar.

In testimony whereof I affix my signature.

EDGAR E. GREVE.